US010145337B2

United States Patent
Summers et al.

(10) Patent No.: US 10,145,337 B2
(45) Date of Patent: Dec. 4, 2018

(54) ELECTRODE IGNITION AND CONTROL OF ELECTRICALLY OPERATED PROPELLANTS

(71) Applicant: Raytheon Company, Waltham, MA (US)

(72) Inventors: Matt H. Summers, Marana, AZ (US); James K. Villarreal, Tucson, AZ (US); Mark T. Langhenry, Tucson, AZ (US); Jeremy C. Danforth, Tucson, AZ (US); John W. Walter, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 286 days.

(21) Appl. No.: 15/197,421

(22) Filed: Jun. 29, 2016

(65) Prior Publication Data

US 2018/0003130 A1 Jan. 4, 2018

(51) Int. Cl.
*F02K 9/26* (2006.01)
*B60R 21/264* (2006.01)
*F02K 9/95* (2006.01)
*F02K 9/94* (2006.01)
*F42C 19/08* (2006.01)
*B60R 21/26* (2011.01)

(52) U.S. Cl.
CPC .............. *F02K 9/26* (2013.01); *B60R 21/264* (2013.01); *F02K 9/94* (2013.01); *F02K 9/95* (2013.01); *F42C 19/0819* (2013.01); *B60R 2021/26029* (2013.01)

(58) Field of Classification Search
CPC ........... F02K 9/26; F02K 9/95; B60R 21/264; B60R 2021/26029; F24C 19/0819
See application file for complete search history.

(56) References Cited

U.S. PATENT DOCUMENTS

| 5,711,546 | A | * | 1/1998 | Hamilton | B60R 21/272 |
| | | | | | 280/736 |
| 6,474,684 | B1 | * | 11/2002 | Ludwig | B60R 21/2644 |
| | | | | | 280/736 |
| 7,337,856 | B2 | * | 3/2008 | Lund | A62C 99/0018 |
| | | | | | 169/42 |
| 7,404,288 | B2 | * | 7/2008 | Sarigul-Klijn | F02K 9/72 |
| | | | | | 60/200.1 |
| 8,464,640 | B2 | | 6/2013 | Sawka | |
| 8,857,338 | B2 | | 10/2014 | Sawka et al. | |
| 8,950,329 | B2 | | 2/2015 | Villarreal et al. | |

(Continued)

*Primary Examiner* — Karen Beck
(74) *Attorney, Agent, or Firm* — Eric A. Gifford

(57) ABSTRACT

Electrical ignition of electrically operated propellant in a gas generation system provides an ignition condition at an ignition surface between a pair of electrodes that satisfies three criteria of a current density J that exhibits a decreasing gradient along an axis normal to an ignition surface, is substantially constant across the ignition surface and exceeds an ignition threshold at the ignition surface. These criteria may be satisfied by one or more of an angled electrode configuration, a segmented electrode configuration or an additive to the electrically operated propellant that modifies its conductivity. These configurations improve burn rate control and consumption of the available propellant and are scalable to greater propellant mass to support larger gas generation systems.

25 Claims, 10 Drawing Sheets

(56) References Cited

U.S. PATENT DOCUMENTS

| | | | |
|---|---|---|---|
| 2004/0050283 A1* | 3/2004 | Daoud | B60R 21/2644 |
| | | | 102/489 |
| 2006/0011276 A1* | 1/2006 | Grix | C06B 45/10 |
| | | | 149/1 |
| 2008/0087003 A1 | 4/2008 | Dulligan et al. | |
| 2008/0134924 A1 | 6/2008 | Sawka | |
| 2015/0343988 A1* | 12/2015 | Villarreal | B60R 21/2644 |
| | | | 280/742 |
| 2017/0253536 A1* | 9/2017 | Danforth | C06B 21/0075 |
| 2017/0284339 A1* | 10/2017 | Koehler | F02K 9/28 |
| 2018/0051657 A1* | 2/2018 | Villarreal | C06B 27/00 |
| 2018/0058377 A1* | 3/2018 | Villarreal | F02K 9/26 |

* cited by examiner

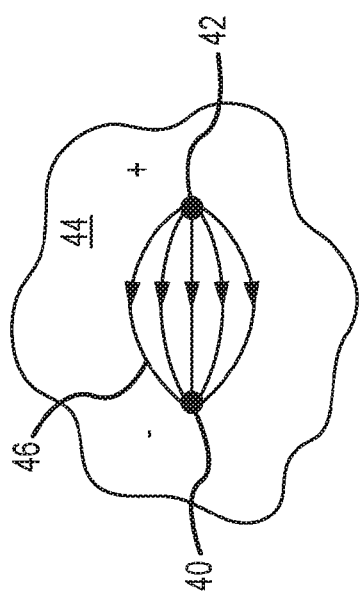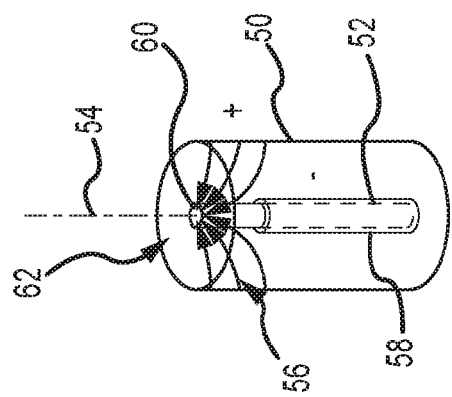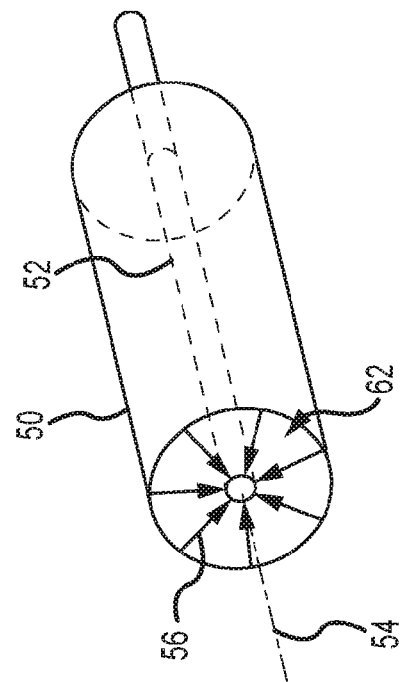

ELECTRODE IGNITION AND CONTROL OF ELECTRICALLY OPERATED PROPELLANTS

BACKGROUND OF THE INVENTION

Field of the Invention

This invention relates to electrically operated propellants, and more particularly to controlling the ignition conditions of the propellant to efficiently and controllably ignite, burn and consume the electrically operated propellants in a manner that is scalable to combust an increased propellant mass for larger gas generation systems.

Description of the Related Art

All propellants are a combination of oxidizer, fuel, binder and additives. The oxidizer provides oxygen required to burn the fuel. The binder provides a structural material to bind the fuel and oxidizer. The binder itself is a fuel. Additional fuel may or may not be required. Additives may be used for a variety of purposes including to assist curing of the propellant, to control the burn rate, etc. Propellant may be used for gas generators, rocket motors, air bags and the like. It is desirable that substantially all of the propellant is or can be consumed.

Solid rocket motor (SRM) propellants are ignited thermally and burn vigorously to completion of the propellant. SRM propellants typically exhibit a designed burn rate and consume substantially all of the propellant. However, the burn rate cannot be independently controlled. Furthermore, once ignited, SRM propellants cannot be "turned off" except by a violent and uncontrolled depressurization. The most common oxidizer for SRM propellants is a solid ammonium perchlorate (AP). The resulting SRM propellant ignites in response to heat but is electrically inert.

Electrically operated propellants are ignited by application of an electric input. In a simple configuration, a voltage is applied between parallel wires embedded in the propellant. Application of the voltage across the propellant creates a current density (J)=current (I)/area (A) of the propellant. The current density J must exceed an ignition threshold of the propellant to ignite and burn. To support electrical operation, the oxidizer is "ionic" in the sense of providing free-flowing ions necessary for electrical control. The burn rate of the propellant may be controlled via the electric input.

Certain formulations of the propellant, and more specifically the oxidizer, allow combustion to be extinguished by interruption of the electric input as long as the chamber pressure remains less than a self-sustaining threshold pressure. The propellant may be reignited by reapplication of the electric input. Sawka's hydroxyl-ammonium nitrate (HAN) based propellant (U.S. Pat. No. 8,857,338) exhibits a threshold of about 150 psi. Villarreal's perchlorate-based propellant (U.S. Pat. No. 8,950,329) can be configured to exhibit a threshold greater than 200, 500, 1.500 and 2,000 psi. These higher threshold pressures allow for more practical applications in which the combustion may be turned on and off at elevated chamber pressures. For these reasons, electrically operated propellants are an attractive option to more mature SRM propellants. A challenge to achieve wide spread use is to provide an electrode configuration that provides for control of the burn rate and efficient consumption of substantially all of the propellant, and one that is scalable to combust greater propellant mass to support larger gas generation systems.

U.S. Pat. No. 8,857,338 "Electrode Ignition and Control of Electrically Ignitable Materials" also discloses an apparatus for providing electrically initiated and/or controlled combustion of electrically ignitable propellants is provided. In one example, the apparatus includes a volume of electrically ignitable propellant (solid and/or liquid), which is capable of self-sustaining combustion, and two (or more) electrodes operable to ignite the propellant. The apparatus may further include a power supply and controller in electrical communication with the electrodes for supplying a potential across the electrodes to initiate combustion of the propellant and/or control the rate of combustion of the propellant. For instance, by increasing or decreasing the power and current supplied through the propellant the rate of combustion may be varied.

Various configurations and geometries of the propellant, electrodes, and apparatus are described. In one example, the electrodes are in electrical contact with the electrically ignitable propellant and are supplied a direct current, which may cause combustion of the electrically ignitable propellant at the contact location of the positive electrode with the electrically ignitable propellant. In another example, the electrodes are supplied an alternating current, which may initiate nearly simultaneously combustion of the electrically ignitable propellant at the contact locations of the electrodes with the electrically ignitable propellant. In some examples, one or more of the electrodes may include an insulator material insulating a portion of the electrode from the electrically ignitable propellant (which may burn away with combustion of the propellant).

In one configuration, a center insulated wire electrode is positioned along the axis of a cylindrical electrode in a coaxial configuration around the propellant (FIGS. 1a-1b). As combustion of the propellant is initiated, the insulation burns away and the propellant regresses along the axis. In another configuration, parallel plate electrodes are positioned to either side of the propellant (FIGS. 3a-3b). In the FIG. 3a embodiment, one of the parallel plate electrodes is insulated to produce combustion of the propellant to spread across the gain-end to the outer cathode. The combustion of the propellant propagates to the left along the axis of the structure, in a generally uniform manner as illustrated. In contrast, in the FIG. 3b embodiment both of the plate electrodes are un-insulated. The propellant is broadly ignited along much of or the entire length of the positive electrode.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides electrode ignition and control of electrically operated propellants that efficiently consumes the available propellant and is scalable to combust increased propellant mass for larger gas generation systems.

This is accomplished with different configurations of electrode structures and electrically operated propellant in a gas generation system that provides an ignition condition at an ignition surface between a pair of electrodes that satisfies three criteria. First, the current density J along an axis normal to the ignition surface exhibits a decreasing gradient. Second, the current density J across the ignition surface is approximately constant. Third, the current density J at the ignition surface exceeds an ignition threshold. Configurations that satisfy all criteria and particularly the second criterion are critical to scalability. Otherwise, the propellant will only ignite at or near the point of maximum current density J, typically at the surface of one of the electrodes, which hinders the ability to control the burn rate and leaves a lot of propellant unconsumed. To satisfy the second criterion, the contour of the ignition surface is designed and built to match the contour of current lines between the electrodes. At least 95% of the available mass of the propellant is consumed. If combustion is interrupted, that means at least 95% of the available mass up to the point of extinguishment.

Different embodiments of a gas generation system may be configured to consume at least 10 grams, 100 grams, 1,000 grams or more of electrically operated propellant.

In an embodiment, the electrically operated propellant comprises an ionic perchlorate-based oxidizer such that the propellant has a self-sustaining threshold pressure of at least 500 psi at which the propellant once ignited by the electrical input cannot be extinguished and below which the propellant can be extinguished by interruption of the electrical input. Combustion may be turned off and on per application requirements. The self-sustaining threshold may be 1,000, 1,500, 2,000 psi or higher.

In an embodiment, the pair of electrodes are angled at greater than 0 degrees and less than 90 degrees with respect to each other such that a cross-section of the propellant between the electrodes increases in area along the axis normal to the ignition surface. In another embodiment, the angle between the electrodes is between 20 and 60 degrees. The electrodes may be symmetric or asymmetric about the axis.

In an embodiment, a conducting or non-conducting additive is added to the electrically operated propellant. The concentration of the additive follows a gradient along the axis normal to the ignition surface. A conductive additive may be a metal powder and a non-conducting additive may be an electrical insulating plastic. This produces the decreasing gradient in current density J along the axis. The electrodes may be configured as parallel plate or angled electrodes.

In an embodiment, each of the electrodes comprises a plurality of sub-electrodes. A network of relays and switches selectively activate one pair of sub-electrodes at a time to propagate the electrical signal along the axis. The current density J constitutes a maximum pulse at the activated pair of sub-electrodes followed by a null current density at the following un-activated pairs of sub-electrodes. The pulse propagates down the axis to ignite the ignition surface as the propellant regresses. This approach may be combined with either or both of the angled electrodes and conductive/non-conductive additive.

In an embodiment, the gas generation system is configured as a radial burning rocket motor. An even number of four or more electrodes is spaced radially about a longitudinal axis of the cylindrical rocket fuselage embedded in the electrically operated propellant. Each adjacent pair of said four or more electrodes is angled at greater than 0 degrees and less than 90 degrees with respect to each other such that a cross-section of the propellant between the electrodes increases in area along an axis normal to an ignition surface that regresses radially along the axis away from the longitudinal axis.

In an embodiment, the gas generation system is configured as an end-burning rocket motor. The electrodes extend axially along the length of the longitudinal axis of the cylindrical rocket fuselage. The electrodes may, for example, be concentric cylindrical electrodes or parallel electrodes. A conducting or non-conducting additive is added to the electrically operated propellant to create a gradient current density J that is maximum at an open end of the rocket motor. An electrical signal ignites the ignition surface at the open end, which burns and regresses along the longitudinal axis.

In an embodiment, the gas generation system is configured with a conductive coating between the electrically operated propellant and the electrodes. This conductive coating will aid in the efficient transfer of the current and provide for mechanical bonding of the electrically operated propellant to the electrodes.

In an embodiment, the gas generation system is configured as an airbag deployment system. The electrically operated propellant suitably comprises an ionic perchlorate-based oxidizer that exhibits a self-sustaining threshold of at least 1,000 psi. Combustion of the electrically operated propellant generates pressured gas that is exhausted from the chamber to inflate the airbag. Chamber pressures remain below the self-sustaining threshold such that interruption of the electrical input extinguishes combustion to control the inflation of the airbag.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is diagram of the current lines between a pair of parallel wire electrodes embedded in electrically operated propellant;

FIGS. 5a and 5b are different views of the current lines between a center electrode and a cylindrical electrode in a coaxial configuration in which is embedded electrically operated propellant;

DETAILED DESCRIPTION OF THE INVENTION

The challenge to provide electrical ignition that provides for control of the burn rate and efficient consumption of substantially all of the available propellant, and one that is scalable to combust greater propellant mass to support larger gas generation systems remains.

Referring now to FIGS. 1, 2 and 3a-3c, different configurations of electrode structures and electrically operable propellant in a gas generation system must provide an ignition condition at an ignition surface between a pair of electrodes that satisfies three criteria to effectively control burn rate, efficiently consume the available propellant and do so in a manner that is scalable to greater propellant mass.

Figure 1:
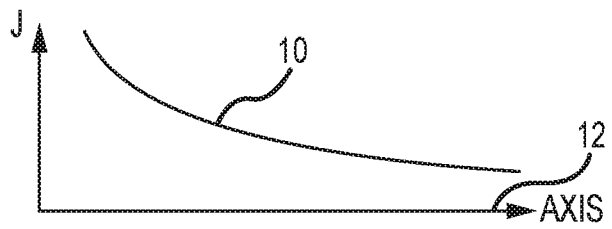
FIG. 1 is a plot of current density J along an axis normal to the ignition surface exhibiting a decreasing gradient.

First, as shown in FIG. 1, a current density J 10 along an axis 12 normal to the ignition surface exhibits a decreasing gradient. The gradient can be produced by, for example, angling and/or segmenting the electrodes and or adding a gradient concentration of a conducting/non-conducting additive to the propellant. The gradient forces combustion to be initiated at the ignition surface having the maximum current density and to regress along the axis normal to the ignition surface in the direction of the decreasing gradient.

Figure 2:
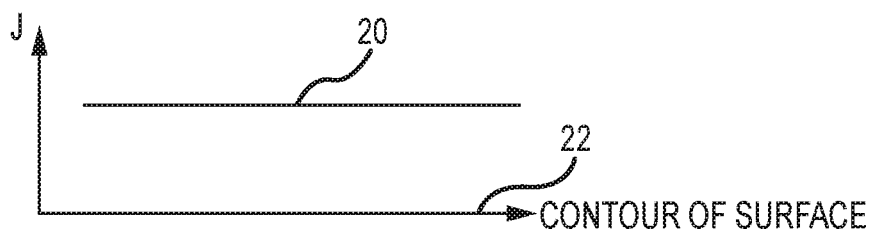
FIG. 2 is a plot of the approximately constant current density J across the contour of the ignition surface.

Second, as shown in FIG. 2, a current density J 20 across the ignition surface 22 is approximately constant. If this condition is satisfied, the entire ignition surface should ignite. Otherwise, the propellant will only ignite at or near the point of maximum current density J, typically at the surface of one of the electrodes or near the middle of the two electrodes, which hinders the ability to control the burn rate and leaves a lot of propellant unconsumed. To satisfy the second criterion, the contour of the ignition surface is designed and built to match the contour of current lines between the electrodes. To do this, the current lines are calculated for a given electrode configuration and electrically operated propellant. The contour of the ignition surface is then designed to match the contour of the current lines. Contouring the ignition surface can change the current lines. The process may be iterated until any effects are negligible. The contour of the ignition surface as built matches the field lines to the limits of manufacturability. In theory, the design of the contour should exactly match the current lines and the contour as built should exhibit less than a 2% deviation. Satisfying this criterion, substantially all (>95%) of the ignition surface should be consumed as the ignition surface regresses.

Figure 3A:
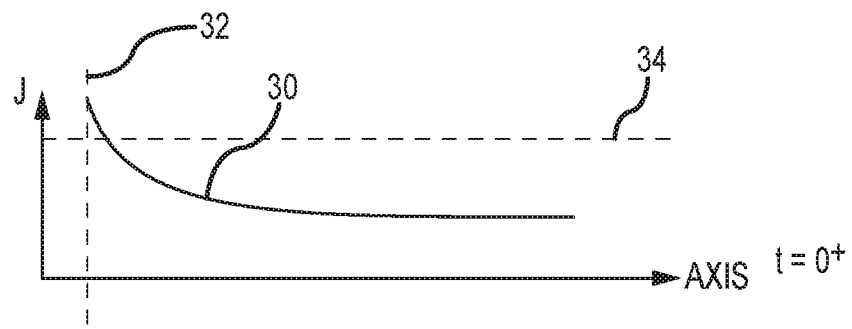
FIGS. 3a-3c are plots of current density J as the ignition surface regresses along the axis.
Figure 3B:
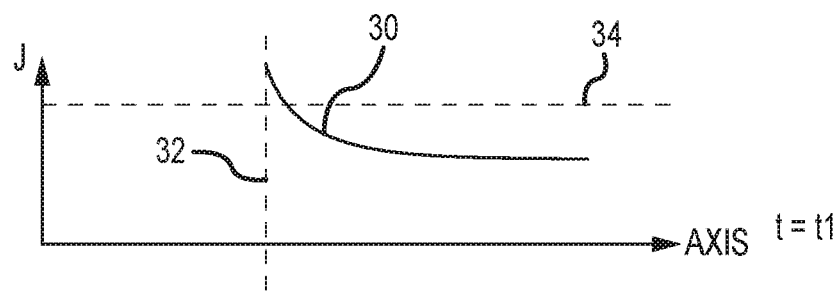
Figure 3C:
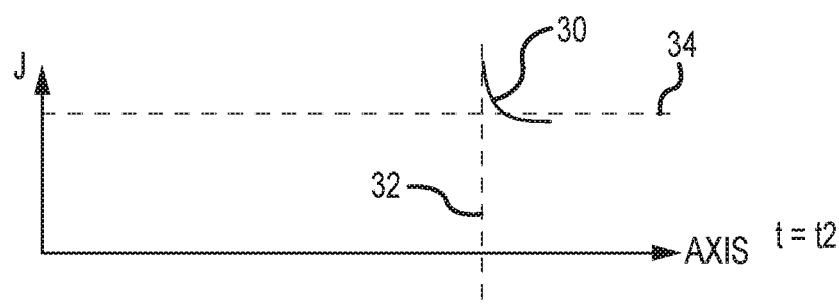

Third, as shown in FIGS. 3a-3c, a current density J 30 at the ignition surface 32 exceeds an ignition threshold 34 as the ignition surface regresses at time t=0+ at initial ignition, t1 and t2. The current density J 30 at the exposed ignition surface must exceed the ignition threshold 34 to combust. The current density J at any cross-section in the bulk of the propellant may or may not exceed ignition threshold 34. Even if current density J in the bulk exceeds the ignition threshold because the current density J exhibits a decreasing gradient along the axis normal to the ignition surface per the first criterion, ignition will initiate at the exposed ignition surface corresponding to the maximum current density J. As the propellant combusts and the ignition surface regresses, rapidly peeling back layers of the propellant, combustion will continue along the axis. If the current density J in the bulk initially does not exceed the ignition threshold, as the propellant is consumed the total available current flows through less propellant thereby raising the current density J above the ignition threshold at the ignition surface.

Configurations that satisfy all criteria and particularly the second criterion are critical to scalability, efficiency and controllability. For propellant masses of at least 10 grams, 100 grams, 1,000 grams or more establishing and maintaining the gradient is required to concentrate the available power such that the current density J at the ignition surface exceeds the ignition threshold to sustain ignition. For such propellant masses the spacing between electrodes increases. Matching the contour of the ignition surface to the current lines such that the current density J is approximately constant across the surface is required to ignite and combust substantially all of the ignition surface. If the current density J exhibits even a minimal amount of variance across the ignition surface, for the larger propellant masses and greater electrode spacing, current will be concentrated at the peaks in the current density J and burn only at or near those peaks, typically at the surface of an electrode or a midpoint between the electrodes leaving a lot of propellant unconsumed. If the criteria are satisfied, substantially all of the available propellant, >95%, should be consumed. If combustion is interrupted, that means at least 95% of the available mass up to the point of extinguishment.

Let us first consider the performance and limitations of known ignition systems and electrode configurations for electrically operated propellants.

As shown in FIG. 4, a pair of parallel wires 40 and 42 are embedded in an electrically operated propellant 44. Current flows from the positive electrode, wire 42, to the negative electrode, wire 40, along current lines 46. The spacing of current lines 46 dictates the current density J. The closer the current lines 46, the higher the current density J. In this configuration, the current density J is the highest at wire 40. The current density J is uniform along an axis into the propellant parallel to the wires. Testing has demonstrated that application of an electrical input to the wires creates an ignition condition in which the propellant at the surface of wire 40 is ignited and the amount of propellant that combusts is very small. The propellant burns for only a small distance away from wire 40 and extinguishes. The parallel wires provide neither the current density J gradient along the axis nor the approximately constant current density J across an ignition surface required to ignite an ignition surface between the wires and cause the ignition surface to regress along the axis.

As shown in FIGS. 5a and 5b, a coaxial electrode configuration includes a cylindrical positive electrode 50 and a negative electrode 52 along the axis 54 of the positive electrode. Current flows from positive electrode 50 to negative electrode 52 along current lines 56. The current density is a maximum at the concentration of current lines 56 at negative electrode 52. The negative electrode 52 is provide with an insulative sleeve 58 that serves to further concentrate the current lines 56 at an exposed end 60 of negative electrode 52. Testing has demonstrated that application of an electrical input to the coaxial electrode configuration creates an ignition condition in which the propellant at an ignition surface 62 at end 60 ignites. This burns back the insulative sleeve 58 allowing ignition surface 62 to regress along axis 54. However, the testing demonstrated that this only holds for very small amounts of propellant, less than 1 gram, and very small electrodes, about 1/8" in diameter for the coaxial configuration. If the diameter of the coaxial electrode is scaled up to accommodate larger propellant mass, the propellant ignites only at or near the center negative electrode 52 leaving much of the propellant unconsumed.

The coaxial electrode structure creates a current density J that is maximum at the center and falls off as 1/radius. This non-uniformity is further exacerbated by the insulative sleeve that concentrates the field lines at the center. For coaxial electrode structures on the order of ⅛" in diameter, the electrical input is sufficient to overcome this non-uniformity and ignite the entire ignition surface. However as the diameter increases the current density J is too low to ignite and combustion is limited to a small area around the center electrode.

Figure 6:
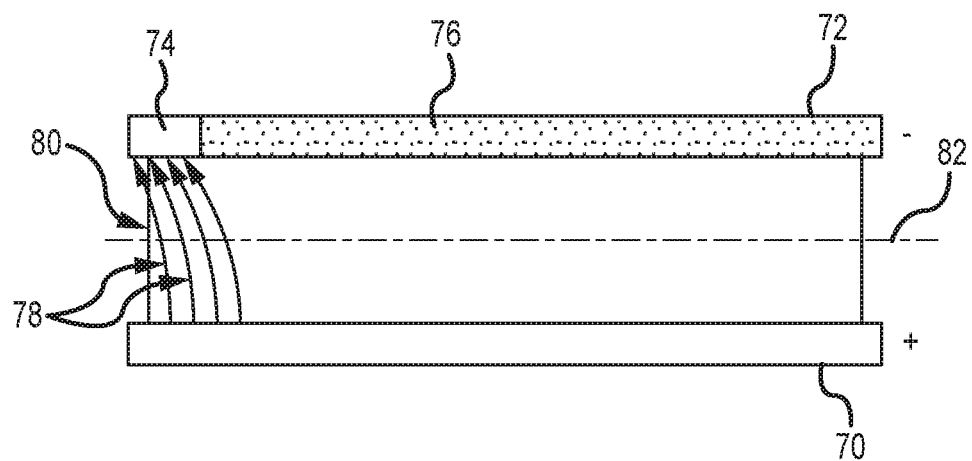
FIG. 6 is a diagram of the current lines between a pair of parallel plate electrodes in which one plate is insulated and burns away as the propellant is consumed.

As shown in FIG. 6, a parallel plate electrode configuration includes a positive plate electrode 70 and a negative plate electrode 72 with a bare end 74 and insulation 76. Similar to the coaxial configuration, the insulation concentrates current lines 78 at the bare end 74 of negative plate electrode 72. Testing has demonstrated that application of an electrical input to the parallel plate configuration creates an ignition condition in which the propellant at an ignition surface 80 at end 74 ignites. This burns back insulation 76 allowing ignition surface 80 to regress along an axis 82 between the plates. However, the testing demonstrated that this only holds for very small amounts of propellant, less than 1 gram, and very small electrodes spaces, about ⅛" between the parallel plates. If the spacing is scaled up to accommodate larger propellant mass, the propellant ignites only at or near the insulated negative plate electrode 72 leaving much of the propellant unconsumed.

The parallel plate structure itself would creates a current density J was uniform across the ignition surface. However, the concentration of the current lines at the bare end of the negative plate electrode 72 produces a non-uniformity in the current density J, which peaks at the negative plate electrode 72 and falls off towards positive plate electrode 70. For small structures, the electrical input is sufficient to overcome this non-uniformity and ignite the entire ignition surface. However as the plate spacing increases the current density J is too low to ignite and combustion is limited to a small area near negative plate electrode 72.

Figure 7:
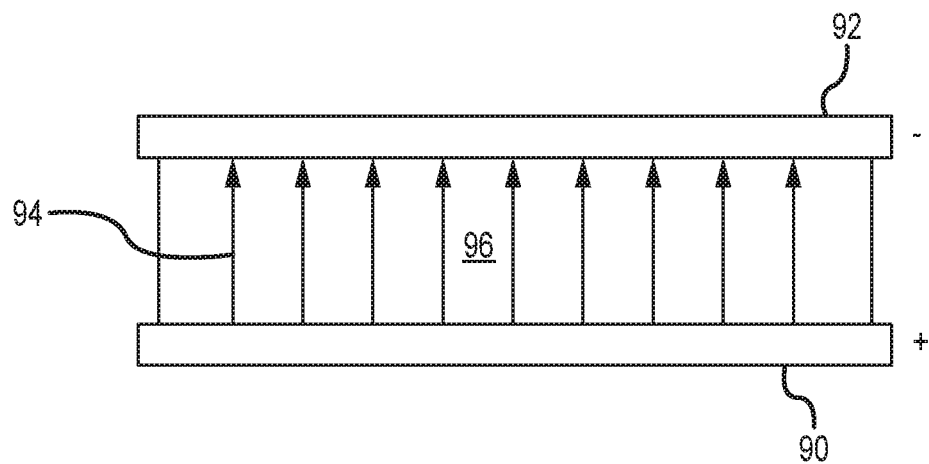
FIG. 7 is a diagram of the current lines between a pair of parallel plate electrodes.

As shown in FIG. 7, a parallel plate electrode configuration includes a positive plate electrode 90 and a negative plate electrode 92. Because neither plate is insulated, current lines 94 match the contour of a desired ignition surface such that the current density J is constant across the ignition surface. However, the current density J is also constant throughout the bulk of the electrically operable propellant 96. This requires a lot of current, i.e., power, to raise the current density J above the ignition threshold to initiate combustion. Furthermore, if the power is sufficient to exceed the ignition threshold testing has demonstrated that the bulk of the electrically operated propellant will all ignite at once. This configuration, without the insulation, does not create a preferential ignition surface to ignite and regress in a controlled manner along an axis between the plates.

None of the known electrode configurations satisfy all three criteria for ignition of an electrically operated propellant.

The present invention provides different configurations of electrode structures and electrically operable propellant in a gas generation system that provide an ignition condition at an ignition surface between a pair of electrodes that satisfies the three criteria of current density J that exhibits a decreasing gradient along an axis normal to an ignition surface, is constant across the ignition surface and exceeds an ignition threshold at the ignition surface. These configurations improve burn rate control and consumption of the available propellant and are scalable to greater propellant mass to support larger gas generation systems.

These configurations are useful for all varieties of electrical operated propellants. The configurations may be used with electrical operated propellants that exhibit no ability to be extinguished, propellants with a HAN-based oxidizer that exhibit a low self-sustaining threshold of about 150 psi, propellants with a perchlorate-based oxidizer that exhibit self-sustaining thresholds above 500, 1,000, 1,500 or event 2,000 psi. U.S. Pat. No. 8,950,329 which details the formulation of the perchlorate-based electrically operated propellant is hereby incorporated by reference. The gas generation systems may be configured to simply burn the entire electrically operated propellant to extinction at a given burn rate, to control the burn rate and burn to extinction, to turn the combustion on and off, and back on again.

Without loss of generality, an embodiment of a gas generation system with an electrically operated propellant that can be throttled and turned on/off/on as long as the chamber pressure remains below the self-sustaining threshold pressure will be presented. An exemplary electrically operated propellant includes a metal-based fuel of approximate 5 to 30 percent of the mass of the propellant, a liquid perchlorate-based ionic oxidizer of approximately 50 to 90 percent of the mass and a binder of approximately 10 to 30 percent of the mass.

Figure 8:
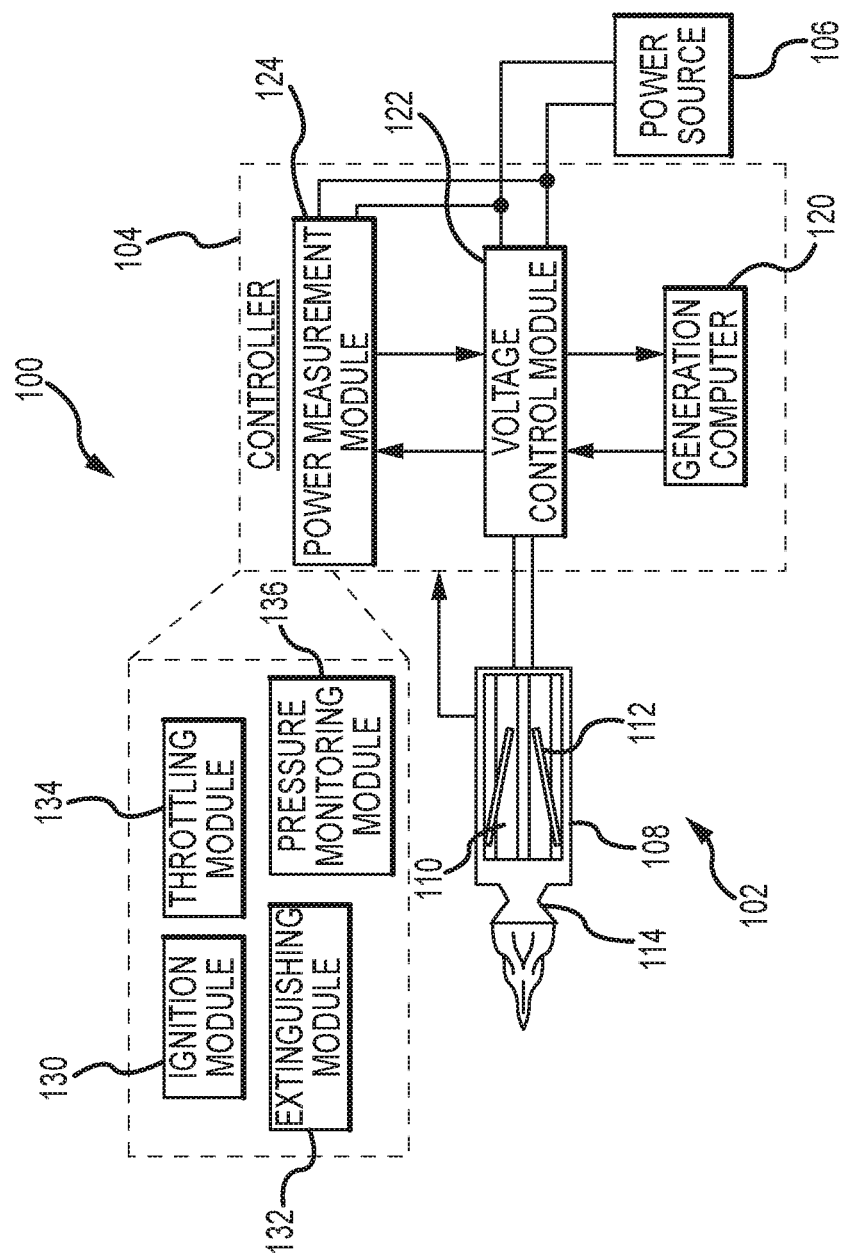
FIG. 8 is a diagram of an embodiment of a gas generation system.

Referring now to FIG. 8, a gas generation system 100 includes a gas generator 102, a controller 104 and a power source 106 such as a battery, generator or the like. Gas generator 102 is usable to provide a source of pressurized gas for a rocket motor, attitude and control systems, gas compressors, ignition systems, airbag inflation systems and the like.

Gas generator 102 includes a combustion chamber 108 having an electrically operated propellant 110 positioned therein. Two or more electrodes 112 extend into the electrically operated propellant 110 within the combustion chamber 112. A nozzle 114 is coupled to combustion chamber 112. Electrically operated propellant 110 includes a formulation that allows for the ignition and extinguishing of the propellant in a variety of conditions according to the application (and interruption of the application) of electricity through the electrodes 112. For instance, the electrically operated propellant 110 is configured to ignite with the application of voltage across the electrodes 112. Conversely, the electrically operated propellant 110 is extinguished with the interruption of the voltage at a range of chamber pressures (e.g., from 500 psi to 2000 psi) less than the self-sustaining threshold pressure. The two or more electrodes 112 and electrically operated propellant 110 are configured to produce an ignition condition that satisfies the three criteria. Ignition and combustion of the electrically operated propellant 110 produces elevated chamber pressures. Gas is exhausted through nozzle 114 to generate high pressure/high velocity gas for a particular application.

Controller 104 is shown as including in one example a generation module 120 (e.g., a flight module for a rocket or airbag inflation module for a vehicle). The generation module 120 is coupled with a voltage control module 122 and a power measurement module 124. In one example, the generation module 120 is a flight module, and the flight module is configured to control the amount of thrust provided as part of a rocket motor. For instance, as ignition, extinguishing and throttling of thrust output from the gas generator 102 is desired, the flight module is configured to provide this control by way of management of the electrical output to the gas generator through control of the voltage control module 122.

The voltage control module 122 is coupled along the electrical circuit between the power source 106 and the gas generator 102. The voltage control module 122 is in one example coupled with the power measurement module 124. The power measurement module is configured to measure the output of the power source and thereby facilitate control and administration of the appropriate amount of electricity such as voltage, current or the like to the gas generator through the voltage control module.

In an embodiment, the generation module 120 includes one or more of an ignition module 130 to control the application of the electrical input to the electrically operated propellant via the electrodes, an extinguishing module 132 to interrupt the application of the electrical input to extinguish combustion, a throttling module 134 to vary the electrical input to increase or decrease the burn rate and a pressure monitoring module 134 to measure the chamber pressure to provide feedback to the other modulates to control ignition, extinguishment and throttling. Each of these modules controls various corresponding functions of the gas generator 102.

Figure 9:
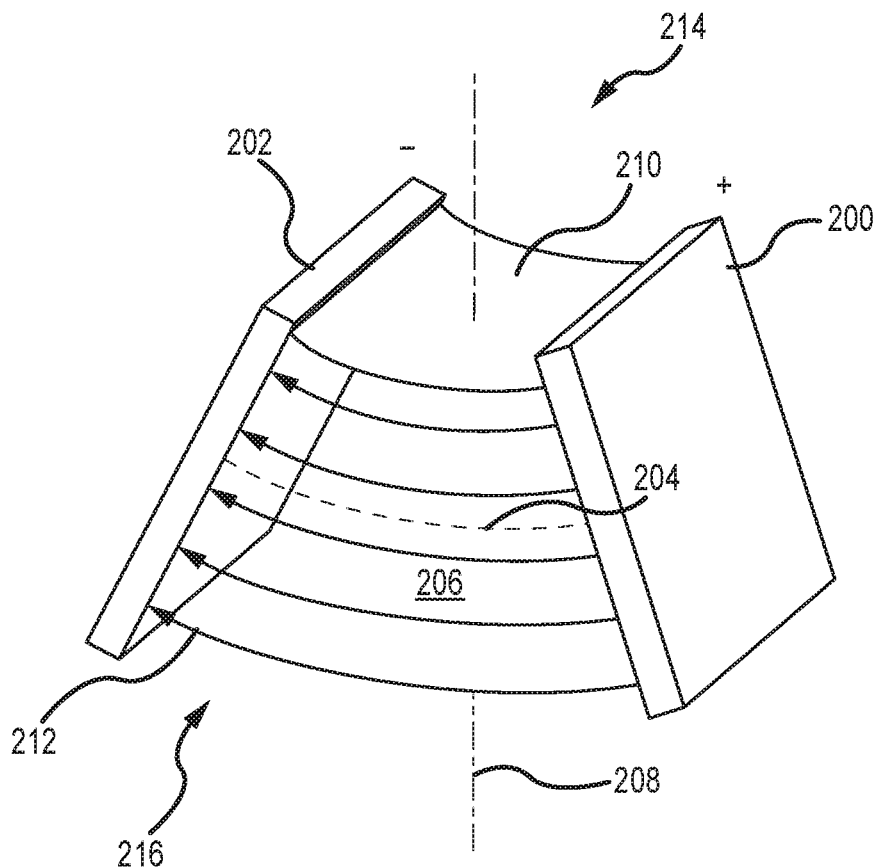
FIG. 9 is a diagram of an embodiment of angled electrodes that create a current density gradient along an axis normal to an ignition surface.

Referring to FIG. 9, an embodiment of an electrode configuration for a gas generator comprises a pair of plate electrodes 200 and 202 that are angled between 0 and 90 degrees, and more typically between 20 and 60 degrees, with respect to each other such that a cross section 204 of an electrically operated propellant 206 increases in area along an axis 208 normal to an ignition surface 210. The increasing diameter of cross-section 204 creates a gradient in the current density J (in a given cross-section) that decreases along the axis. The applied electrical signal, conductivity of the electrically operated propellant and the angle of the pair of electrodes establish a current density J at the ignition surface that exceeds an ignition threshold. The ignition surface is contoured to match the contour of current lines 212 between the plate electrodes. Because the plate electrodes are "angled" (not parallel), the contour that matches the current lines is not flat. The amount of curvature is dictated by the angle between the plates. The current density J at a narrow end 214 will be the highest and will decrease along axis 208 to a lowest value at a wide end 216. Upon application of an electrical input between the pair of plate electrodes 200 and 202, ignition surface 210 at narrow end 214 will ignite across substantially all of the surface and regress along axis 208 normal to the ignition surface. Unless the electrical signal is interrupted to extinguish combustion, combustion will continue along the axis to burn substantially all of the propellant.

Figure 10:
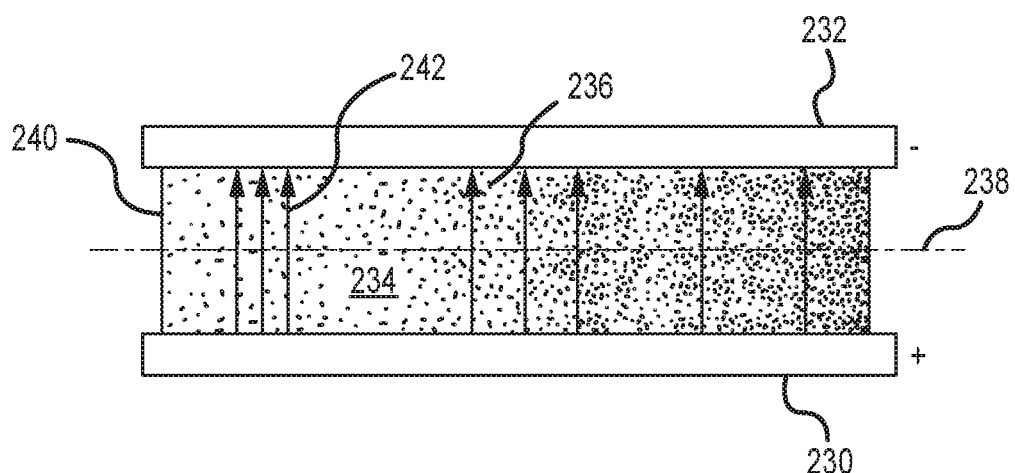
FIG. 10 is a diagram of an embodiment in which the electrically operated propellant includes an additive that creates a current density gradient along an axis normal to an ignition surface.

Referring to FIG. 10, an embodiment of an electrode configuration for a gas generator comprises a pair of parallel plate electrodes 230 and 232 on either side of an electrically operated propellant 234. A conducting or non-conductive additive 236 is added to the electrically operated propellant. The additive 236 has a gradient concentration along an axis 238 normal to an ignition surface 240, which modifies the conductivity of the propellant to have a decreasing gradient along the axis, which in turn produces a current density J with a decreasing gradient along the axis. A conducting additive would have maximum concentration at the ignition surface decreasing along the axis. A non-conductive additive (as shown) would have a minimum concentration at the ignition surface increasing along the axis. The current lines 242 between the parallel plate electrodes 230 and 232 are normal to axis 238 and evenly spaced. Accordingly, the ignition surface has a flat contour to match the current lines. Upon application of an electrical input between the pair of plate electrodes 230 and 232, ignition surface 240 will ignite across substantially all of the surface at the maximum current density J and regress along axis 238 normal to the ignition surface. Unless the electrical signal is interrupted to extinguish combustion, combustion will continue along the axis to burn substantially all of the propellant.

Figure 11:
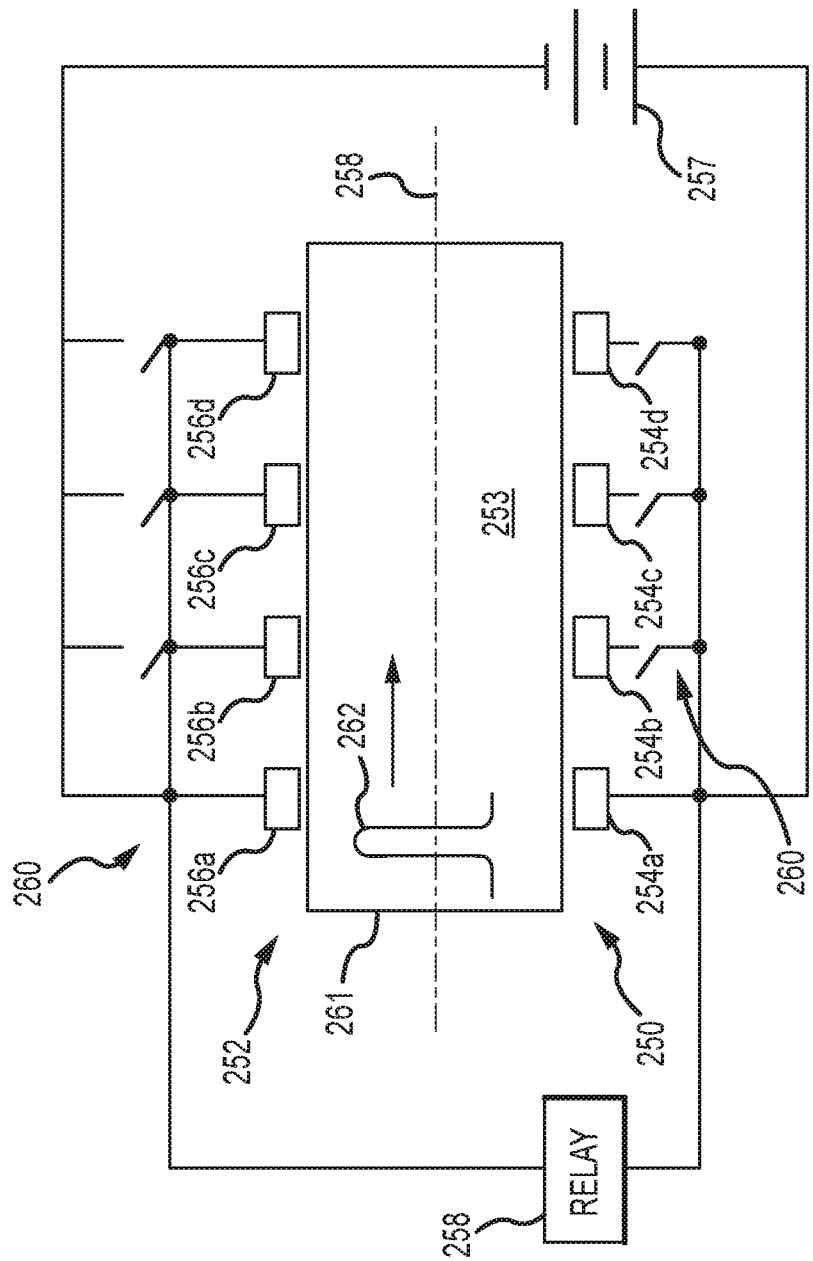
FIG. 11 is a diagram of an embodiment of segmented parallel electrodes that are switched to propagate an electrical input through the electrically operated propellant.

Referring now to FIG. 11, an embodiment of an electrode configuration for a gas generator comprises a pair of parallel plate electrodes 250 and 252 on either side of an electrically operated propellant 253. Each of the electrodes 250 and 252 comprises a plurality of sub-electrodes 254a, 254b, . . . and 256a, 256b, . . . . A network of relay 258 and switches 260 selectively activate one pair of sub-electrodes 254a/256a, 254b/256b . . . at a time to propagate the electrical signal, supplied by voltage source 257, along an axis 258 normal to an ignition surface 261. The decreasing gradient of current density J constitutes a pulse 262 at the activated pair of sub-electrodes followed by a null at the following unactivated pairs of sub-electrodes. The pulse 262 propagates down the axis 258 to ignite the ignition surface 261 as the propellant regresses. The same concept of using segmented electrodes and a network of relays and switches to propagate a pulse through the electrically operated propellant may be applied to angled electrodes or concentric electrodes.

Any two or more of the angled electrodes, non-conducting/conducting additive to the electrically operated propellant and segmented electrodes may be combined. Other configurations of electrode structures and propellant conductivity may be envisioned that satisfy the three criteria for efficient, controllable and scalable combustion of the electrically operated propellant.

Figure 12:
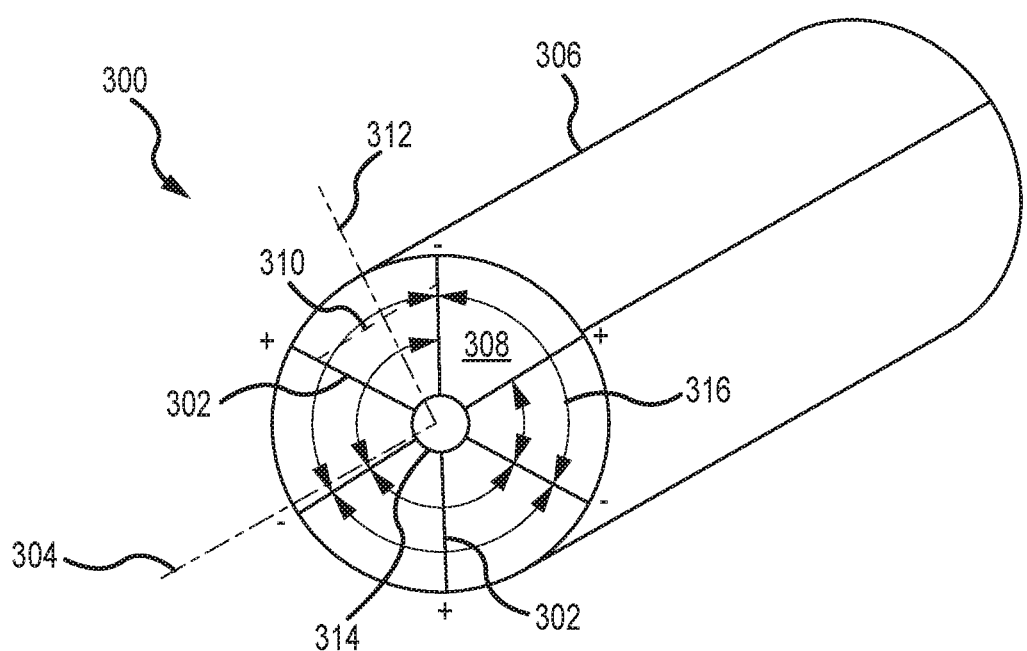
FIG. 12 is a diagram of a radial burning rocket motor with an even number of angled electrodes positioned radially about the rocket motor.

Referring now to FIG. 12, an embodiment of a radial burning rocket motor 300 comprises an even number of four or more electrodes 302 is spaced radially about a longitudinal axis 304 of a cylindrical rocket fuselage 306 and embedded in a electrically operable propellant 308. Each adjacent pair of said four or more the electrodes is angled at greater than 20 degrees and less than 90 degrees with respect to each other such that a cross-section 310 of the propellant between the electrodes increases in diameter along an axis 312 normal to an ignition surface 314 that regresses radially along the axis 312 away from the longitudinal axis 304. Field lines 316 extend from the positive electrodes to the negative electrodes. The resulting pressurized gas is exhausted through a nozzle to produce thrust.

Figure 13:
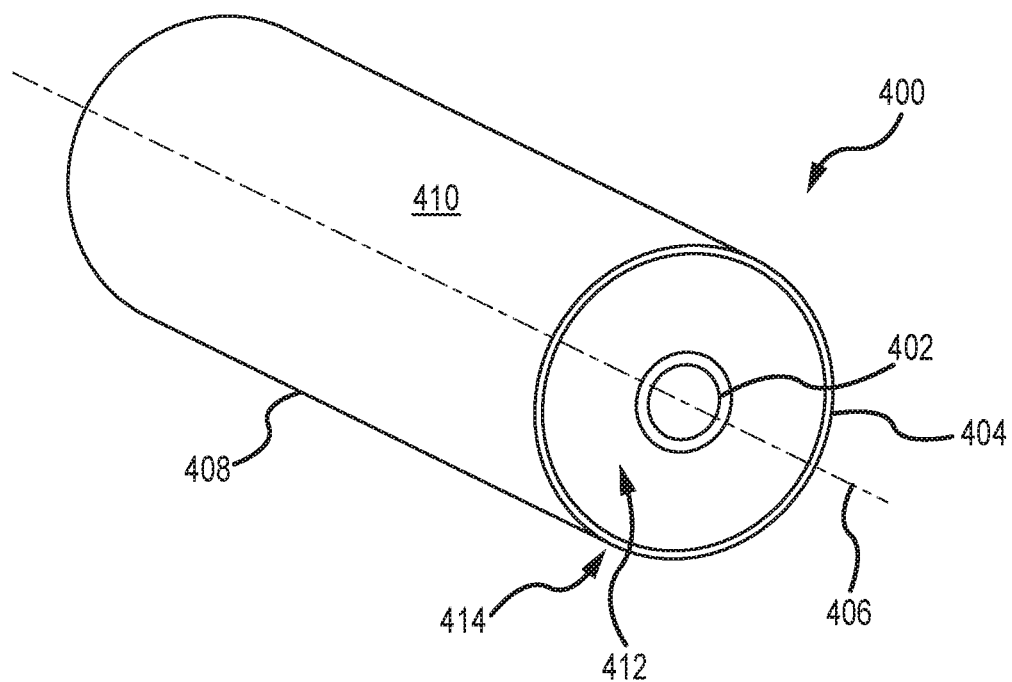
FIG. 13 is a diagram an end burning rocket motor.

Referring now to FIG. 13, an embodiment of an end-burning rocket motor 400 comprises concentric circular electrodes 402 and 404 about a longitudinal axis 406 of a cylindrical rocket fuselage 408, which extend the length of an electrically operable propellant 410 embedded between the inner and outer circular electrodes. Electrically operable propellant 408 is provided with an additive that varies its conductance to create a gradient current density that is a maximum at an ignition surface 412 at an end 414 of the rocket motor. Application of an electrical signal to the concentric circular electrodes ignites ignition surface 412 only at end 414. The ignition surface 412 burns and regresses axially along longitudinal axis 404 to consume the electrically operable propellant. The resulting pressurized gas is exhausted through a nozzle to produce thrust. Alternately, the electrodes may be configured as parallel plates with a rectangular cross-section.

Figure 14:
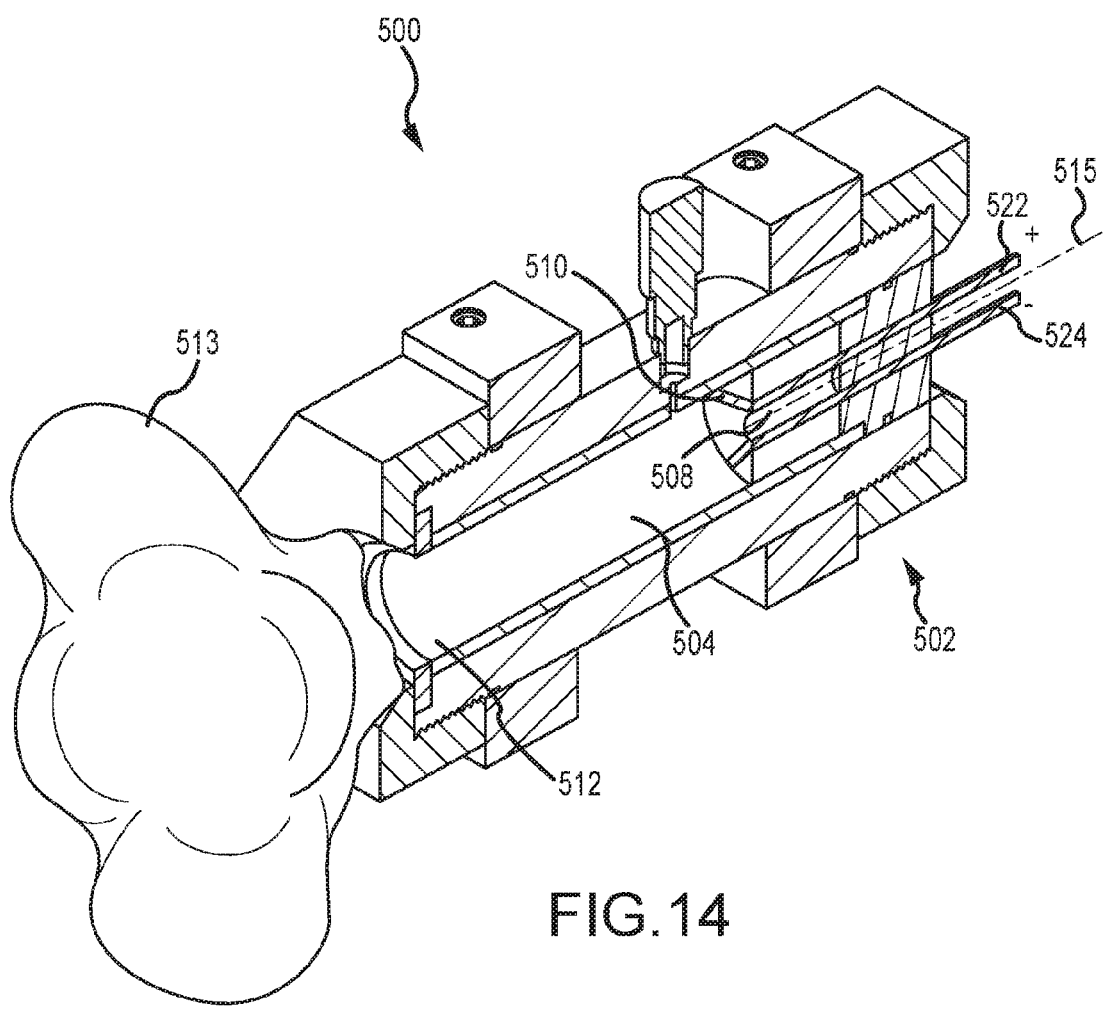
FIG. 14 is a diagram of a gas generation system using a radial configuration of angled electrodes to inflate an airbag.

Referring now to FIG. 14, an embodiment of an airbag inflation system 500 includes a gas generation system 502 that uses an electrically operated propellant 508 within a combustion chamber 504 configured to pressurize the chamber and exhaust high-pressure gas through an opening 512 to inflate an airbag 513. Opening 512 may be or may not be formed as a nozzle. The electrically operated propellant 508 includes a formulation (e.g., a perchlorate-based ionic oxidizer) that allows for the ignition and extinguishing of the propellant in a variety of conditions according to the application (and interruption of the application) of electricity a chamber pressures below a self-sustaining threshold pressure of at least 1,000 psi.

An electrode structure and electrically operated propellant are configured to satisfy the three criteria. In an exemplary embodiment, the ignition system suitably comprising an even number of four or more electrodes 510 that extend into electrically operated propellant 508 within the combustion chamber 504. Electrodes 510 are spaced radially about a longitudinal axis 515 and embedded in an electrically operable propellant 514. Each adjacent pair of said four or more the electrodes is angled at greater than 20 degrees and less than 90 degrees with respect to each other such that a cross-section of the propellant between the electrodes increases in diameter along an axis normal to an ignition surface that regresses radially along the axis away from the longitudinal axis 515. The electrodes alternate as + and − electrodes. The + electrodes are connected to an external positive electrode 522 and the − electrodes are connected to an external negative 524 for connection to a power supply.

To inflate airbag 513, an electrical input is applied through positive and negative electrodes 522 and 524 to alternating electrodes 510 to produce a current density J at the interior ignition surface 520 between each pair of electrodes 510 that exceeds an ignition threshold. Each ignition surface ignites and regresses along axis normal to the ignition surface. The combustion of the electrically operated propellant generates pressured gas in combustion chamber 504. Pressure levels in the chamber reaching more than 500 psi but never more than the self-sustaining threshold pressure. Pressurized gas I the chamber is exhausted through opening 512 to inflate airbag 513. The electrical input is varied to vary a rate of combustion, hence varying the pressure levels in the chambers to control a pressure profile of the airbag. The electrical signal is interrupted to extinguish combustion of the propellant to control a total pressure impulse delivered to the airbag. Combustion may be turned on and off by application and interruption of the electrical signal While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A gas generation system, comprising:
a combustion chamber;
an electrically operated propellant within the combustion chamber; and
a pair of electrodes configured for coupling with an electrical power source, said electrical power source configured to apply an electrical input across the electrodes creating an ignition condition in which (a) a current density (J) through the propellant between the pair of electrodes on an ignition surface exhibits a decreasing gradient along an axis normal to the ignition surface, (b) a contour of the ignition surface approximately matches a contour of current lines between the electrodes to within 5% such that current density J is approximately constant across the ignition surface to within 5% and (c) the current density J at the ignition surface exceeds an ignition threshold as approximately all of ignition surface burns and regresses along the axis.

2. The gas generation system of claim 1, wherein at least 95% of the ignition surface burns as the surface regresses along the axis.

3. The gas generation system of claim 1, wherein the system comprises at least 10 grams of the electrically operated propellant that is consumed as the ignition surface burns and regresses along the axis.

4. The gas generation system of claim 1, wherein the system comprises at least 100 grams of the electrically operated propellant that is consumed as the ignition surface burns and regresses along the axis.

5. The gas generation system of claim 1, wherein the system comprises at least 1,000 grams of the electrically operated propellant that is consumed as the ignition surface burns and regresses along the axis.

6. The gas generation system of claim 1, wherein said pair of electrodes are angled at greater than 0 degrees and less than 90 degrees with respect to each other such that a cross-section of the propellant between the electrodes increases in area along the axis normal to the ignition surface.

7. The gas generation system of claim 1, further comprising a conducting or non-conductive additive in the electrically operated propellant having a gradient concentration along the axis normal to the ignition surface.

8. The gas generation system of claim 1, wherein the electrically operated propellant comprises an ionic perchlorate-based oxidizer such that the propellant has a self-sustaining threshold pressure of at least 500 psi at which the propellant once ignited by the electrical input cannot be extinguished and below which the propellant can be extinguished by interruption of the electrical input.

9. The gas generation system of claim 8, wherein the self-sustaining threshold pressure is at least 1,000 psi.

10. The gas generation system of claim 1, further comprising:
an airbag coupled to the combustion chamber, wherein the combustion of the electrically operated propellant generates pressured gas that is exhausted from the chamber to inflate the airbag.

11. A gas generation, comprising:
a combustion chamber;
an electrically operated propellant within the combustion chamber; and
a pair of electrodes configured for coupling with an electrical power source, said electrical power source configured to apply an electrical input across the electrodes creating an ignition condition in which (a) a current density (J) through the propellant between the pair of electrodes on an ignition surface exhibits a decreasing gradient along an axis normal to the ignition surface, (b) a contour of the ignition surface approximately matches a contour of current lines between the electrodes such that current density J is approximately constant across the ignition surface and (c) the current density J at the ignition surface exceeds an ignition threshold as approximately all of ignition surface burns and regresses along the axis, wherein each of said pair of electrodes comprises a plurality of sub-electrodes, further comprising a network of a relay and a plurality of switches that activate one pair of sub-electrodes at a time to propagate the electrical signal along the axis.

12. A gas generation system, comprising:
a cylindrical combustion chamber;
an electrically operated propellant within the combustion chamber;
an even number of four or more said electrodes spaced radially about a longitudinal axis of the cylindrical combustion chamber embedded in said electrically operated propellant for coupling with an electrical power source, said electrical power source configured to apply an electrical input across the electrodes creating an ignition condition in which (a) a current density (J) through the propellant between the pair of electrodes on an ignition surface exhibits a decreasing gradient along an axis normal to the ignition surface, (b) a contour of the ignition surface approximately matches a contour of current lines between the electrodes such that current density J is approximately constant across the ignition surface and (c) the current density J at the ignition surface exceeds an ignition threshold as approximately all of ignition surface burns and regresses along the axis, each adjacent pair of said four or more said electrodes angled at greater than 20 degrees and less than 90 degrees with respect to each other such that a cross-section of the propellant between the electrodes increases in diameter along an axis normal to an ignition surface that regresses radially along the axis away from the longitudinal axis.

13. A gas generation system, comprising:
a cylindrical combustion chamber;
an electrically operated propellant within the combustion chamber;
at least two electrodes configured for coupling with an electrical power source, wherein said at least two said electrodes extend axially about a longitudinal axis of the cylindrical combustion chamber embedded in said electrically operated propellant, said electrical power source configured to apply an electrical input across the electrodes creating an ignition condition in which (a) a current density (J) through the propellant between the pair of electrodes on an ignition surface exhibits a decreasing gradient along an axis normal to the ignition surface, (b) a contour of the ignition surface approximately matches a contour of current lines between the electrodes such that current density J is approximately constant across the ignition surface and (c) the current density J at the ignition surface exceeds an ignition threshold as approximately all of ignition surface burns and regresses along the axis; and
a conducting or non-conductive additive in the electrically operated propellant having a gradient concentration along the longitudinal axis normal to the ignition surface,
wherein said ignition surfaces ignites at an end of the cylindrical combustion chamber and regresses along the longitudinal axis.

14. A gas generation system, comprising:
a combustion chamber;
an electrically operated propellant within the combustion chamber; and
a pair of electrodes configured for coupling with an electrical power source,
wherein said pair of electrodes are angled at greater than 20 degrees and less than 90 degrees with respect to each other such that a cross-section of the propellant between the electrodes increases in diameter along an axis normal to an ignition surface,
wherein said electrical power source is configured to apply an electrical input across the electrodes creating an ignition condition in which the ignition surface ignites and regresses along the axis,
wherein the electrically operated propellant comprises an ionic perchlorate-based oxidizer such that the propellant has a self-sustaining threshold pressure of at least 500 psi at which the propellant once ignited by the electrical input cannot be extinguished and below which the propellant can be extinguished by interruption of the electrical input.

15. The gas generation system of claim 14, further comprising:
a conducting or non-conductive additive in the electrically operated propellant having a gradient concentration along an axis normal to an ignition surface.

16. The gas generation system of claim 14, wherein the system comprises at least 100 grams of the electrically operated propellant of which at least 95% is consumed as the ignition surface burns and regresses along the axis.

17. A gas generation system, comprising:
a combustion chamber;
an electrically operated propellant within the combustion chamber;
a pair of electrodes configured for coupling with an electrical power source,
a conducting or non-conductive additive in the electrically operated propellant having a gradient concentration along an axis normal to an ignition surface;
wherein said electrical power source is configured to apply an electrical input across the electrodes creating an ignition condition in which the ignition surface ignites and regresses along the axis.

18. The gas generation system of claim 17, wherein the system comprises at least 100 grams of the electrically operated propellant of which at least 95% is consumed as the ignition surface burns and regresses along the axis.

19. The gas generation system of claim 17, wherein the electrically operated propellant comprises an ionic perchlorate-based oxidizer such that the propellant has a self-sustaining threshold pressure of at least 500 psi at which the propellant once ignited by the electrical input cannot be extinguished and below which the propellant can be extinguished by interruption of the electrical input.

20. A gas generation system, comprising:
a combustion chamber;
an electrically operated propellant within the combustion chamber, said electrically operated propellant comprises an ionic perchlorate-based oxidizer such that the propellant has a self-sustaining threshold pressure of at least 500 psi at which the propellant once ignited by an electrical input cannot be extinguished and below which the propellant can be extinguished by interruption of the electrical input;
a pair of electrodes configured for coupling with an electrical power source; and
a controller configured to apply the electrical input across the electrodes creating an ignition condition in which (a) a current density (J) through the propellant between the pair of electrodes on an ignition surface exhibits a decreasing gradient along an axis normal to the ignition surface, (b) a contour of the ignition surface approximately matches a contour of current lines between the electrodes such that current density J is approximately constant across the ignition surface and (c) the current density J at the ignition surface exceeds an ignition threshold as approximately all of ignition surface burns and regresses along the axis, said combustion generating pressurized gas within the chamber at levels less than the self-sustaining threshold pressure and to interrupt the electrical input to extinguish the electrically operated propellant.

21. The gas generation system of claim 20, wherein the system comprises at least 100 grams of the electrically operated propellant of which at least 95% of the encountered mass is consumed as the ignition surface burns and regresses along the axis up to the point of extinguishment.

22. The gas generation system of claim 20, wherein said pair of electrodes are angled at greater than 20 degrees and less than 90 degrees with respect to each other such that a cross-section of the propellant between the electrodes increases in diameter along the axis normal to the ignition surface.

23. The gas generation system of claim 20, further comprising a conducting or non-conductive additive in the electrically operated propellant having a gradient concentration along the axis normal to the ignition surface.

24. The gas generation system of claim 20, wherein each of said electrodes comprises a plurality of sub-electrodes, further comprising a network of a relay and a plurality of switches that propagate the electrical signal along the axis.

25. The gas generation system of claim 20, further comprising:
    an airbag coupled to the combustion chamber, wherein the combustion of the electrically operated propellant generates pressured gas that is exhausted from the chamber to inflate the airbag.

\* \* \* \* \*